United States Patent
Kim et al.

(10) Patent No.: US 7,272,132 B2
(45) Date of Patent: Sep. 18, 2007

(54) WIRELESS COMMUNICATION APPARATUS AND METHOD CAPABLE OF ADJUSTING BEACON PERIOD

(75) Inventors: Yong-suk Kim, Daejeon (KR); Jong-hun Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1040 days.

(21) Appl. No.: 10/302,415

(22) Filed: Nov. 25, 2002

(65) Prior Publication Data

US 2003/0103487 A1 Jun. 5, 2003

(30) Foreign Application Priority Data

Nov. 30, 2001 (KR) .......................... 2001-0075530

(51) Int. Cl.
*H04J 3/06* (2006.01)

(52) U.S. Cl. ..................... 370/350; 370/458; 370/459; 370/468

(58) Field of Classification Search ...... 455/41.1–41.3, 455/450–453, 521–523; 370/348, 459, 458, 370/465, 468

See application file for complete search history.

(56) References Cited

U.S. PATENT DOCUMENTS

| | | | | |
|---|---|---|---|---|
| 5,535,207 | A | * | 7/1996 | Dupont ....................... 370/433 |
| 6,018,642 | A | * | 1/2000 | Adachi ....................... 340/7.33 |
| 6,570,857 | B1 | * | 5/2003 | Haartsen et al. ............ 370/312 |
| 2002/0191583 | A1 | * | 12/2002 | Harris et al. ................ 370/345 |
| 2004/0185857 | A1 | * | 9/2004 | Lee et al. ................... 455/445 |
| 2006/0183423 | A1 | * | 8/2006 | Johansson et al. ......... 455/41.2 |
| 2006/0211372 | A1 | * | 9/2006 | Shellhammer et al. ..... 455/41.2 |

FOREIGN PATENT DOCUMENTS

WO  WO99/37106 A1  7/1999

OTHER PUBLICATIONS

"Bluetooth Specification Version 1.0 B, Core"; Dec. 1, 1999, Bluetooth Specification Version, XX, XX, vol. 1, pp. 95-126; XP002174708.

* cited by examiner

*Primary Examiner*—Duc M. Nguyen
*Assistant Examiner*—Eric J Elcenko
(74) *Attorney, Agent, or Firm*—Sughrue Mion Pllc.

(57) ABSTRACT

A wireless communication apparatus capable of adjusting a time interval between slot sections in accordance with the amount of traffic in a piconet. The wireless communication apparatus has a transceiver for sending and receiving data to and from an external device, a beacon channel generator for generating a train of beacon slots during a park mode, with a constant interval, a slot section calculator for calculating the time interval of the trains of beacon slots consecutively generated based on a coefficient of slot utilization and a wakeup ratio, and a controller for controlling the beacon channel generator for allowing the trains of beacon slots to be generated at the time interval calculated by the slot section calculator. The beacon channel generator sets up an access window for activating the data communication with the external device, after the trains of beacon slots are generated. Accordingly, the wireless communication apparatus can cope with the change of traffic characteristics of piconet environment, as the time interval of the trains of beacon slots can be adjusted according to the coefficient of slot utilization and the wakeup ratio of the slot section.

12 Claims, 4 Drawing Sheets

WIRELESS COMMUNICATION APPARATUS AND METHOD CAPABLE OF ADJUSTING BEACON PERIOD

BACKGROUND OF THE INVENTION

1. Field of the Invention

The present invention relates to a wireless communication apparatus and a method thereof, and more particularly, to a wireless communication apparatus capable of adjusting a beacon period generated in a park mode and a method for adjusting the same. The present application is based on Korean Patent Application No. 2001-75530, filed Nov. 30, 2001, which is incorporated herein by reference.

2. Description of the Prior Art

Bluetooth is a code name of a wireless data communication technology engaged in general fields of electrical communication, networking, computing and consumer goods. The Bluetooth technology can replace several cables required for an apparatus with a single wireless connection in a remote distance. For example, when the Bluetooth technology is realized in a mobile phone and a laptop computer, the apparatuses can be used without being connected with a cable. As the apparatuses that can be part of the Bluetooth system, there are a printer, a PDA (personal digital assistance), a desktop computer, a fax, a keyboard, and a joystick. As a matter of fact, all kinds of digital apparatuses can be part of the Bluetooth system.

Generally, the Bluetooth system has a maximum data transmission speed of 1 Mbps, and a maximum transmission distance of 10 m. 1 Mbps is a frequency in a region of the ISM (industrial scientific medical) frequency band of 2.4 GHz that a user can use without possessing a license, and is the transmission speed that can be easily realized with low costs. Moreover, the transmission distance 10 m is the result of a decision that 10 m is an adequate distance between an apparatus possessed by the user and a desktop computer in an office.

As the Bluetooth system has been designed to operate in a radio frequency environment having much noise, it employs a frequency hopping scheme of 1600 times per second for stable data transmission in a wireless frequency. Here, the frequency hopping method is one of a spread spectrum technology as well as a direct sequence method. The frequency hopping has one difference from the direct sequence method in the point that the frequency of a carrier signal is changed several times in every second.

The Bluetooth system supports not only one-to-one connections but also one-to-multiple connections. As shown in FIG. 1, a plurality of piconets can be formed and connected with one another. Each piconet is divided according to an order of the frequency hopping different from each other. In this case, the piconet is a Bluetooth network formed by a single master having one or more slaves connected thereto. The piconet can have a single master and a maximum of seven slaves. The master and the slaves communicate bilaterally by time division duplex (TDD) basically by using one hopping slot (625 µs=1/1600) as a unit. A plurality of piconets systematically connected with one another is called a scatternet.

FIG. 2 is a view showing the communication by the TDD between the master and the slaves. Referring to FIG. 2, the length of each channel allocated to the time slot is 625 µs. The number of time slots is determined in accordance with a Bluetooth clock of the piconet master. The master and the slaves transmit the packet selectively in the time slots. In other words, the master transmits the packet only in the even-numbered time slots, and the slaves transmit the packet only in the odd-numbered time slots. Moreover, each of the packets transmitted to the master and the salves should be realized within five time slots. When multiple slots are transmitted, the hopping frequency of the time slot in which the transmission packet starts is used as the hopping frequency of all the packets. Here, the packet is a unit of data transmitted through the piconet channel.

To save power in the Bluetooth connection, the master can operate the slaves in a hold mode, a sniff mode, and a park mode. In the hold mode, a slave enters a sleep state, keeping an Active Member Address (AM_ADDR) and maintains connection with the master. In the sniff mode, the duty cycle of the slave's listen activity is reduced, while the slave keeps the AM_ADDR and the connection with the master. In the park mode, the slave gives up its active mode address AM_ADDR and enters a sleep state, while keeping the connection with the master. Accordingly, before entering into the park mode, the slave receives from the master a new address to be used in the park mode, such as a Parked Member Address (PM_ADDR) or an Access Request Address (AR_ADDR).

Here, the AM_ADDR is expressed as a member address, and distinguishes active members participating in the piconet. In other words, when two or more slaves are connected to a single master in the piconet, the master allocates a temporary 3-bit address to each slave, which will be used when the slaves wake up, to distinguish one slave from another. Therefore, all the packets transmitted between the master and the slaves carry AM_ADDR. In other words, the AM_ADDR of the slaves are used not only for the packet from the master to the slaves but also for the packet from the slaves to the master. When the slaves are not connected with the master, or when the slaves are in the park mode, the allocated AM_ADDR is given up. When the salves are re-connected with the master, a new AM_ADDR should be allocated. The reason for limiting the number of masters and slaves of the piconet to a single master and seven slaves is that the address AM_ADDR allocated by the master to the wakeup slaves is defined to be 3-bits according to the Bluetooth standard. In other words, among a maximum of eight addresses, the address '000' is used for broadcasting from the master to the slaves, and only the seven addresses from '001' to '111' are used as the AM_ADDR.

The PM_ADDR distinguishes a parked slave from the other parked slaves. The parked slaves wake up at regular intervals to listen to the channel in order to re-synchronize and to check for broadcast messages. To support parked slaves, the master establishes a beacon channel when one or more slaves are parked.

FIG. 3 is a view showing a format of a general beacon channel. FIG. 4 is a view explaining an access window. Referring to FIGS. 3 and 4, the beacon channel consists of one beacon slot or a train of equidistant beacon slots which is transmitted periodically with a constant time interval. Referring to FIG. 3, the train of $N_B$ ($N_B \geq 1$) beacon slots and the next train of beacon slots are defined with an interval of $T_B$ slots. The beacon slots in the train are separated by $\Delta_B$. The start of the first beacon slot of the train is called a beacon instant, and serves as the beacon timing reference. In other words, the train of beacon slots $T_B$ is the same as the beacon instant and the next beacon instant. Beacon parameters $N_B$ and $T_B$ are chosen such that there is sufficient time for the parked slaves to be synchronized during a predetermined time window in an error-prone environment. The beacon channel serves four purposes:

1) Transmission of master-to-slave packets which the parked slaves can use for re-synchronization;

2) carrying messages to the parked slaves to change the beacon parameters;

3) carrying general broadcast messages to the parked slaves;

4) unparking of one or more parked slaves.

The master of the piconet sets up the beacon access window by using various parameters to support the slaves in the park mode. During the window, the master gives the parked slaves, which want to be connected to the master, an opportunity for data transmission. This section appears periodically at the end of the beacon slot transmitted from the master to the slaves. The access window is defined where the parked slaves can send request signals to be unparked. To increase the reliability, the access window can be repeated $M_{access}$ times ($M_{access} \geq 1$). The access window starts a fixed delay $D_{access}$ after the beacon instant until the start of the access window.

As described so far, in the current Bluetooth standard, it is not defined that the beacon parameter $T_B$ should be determined as a certain value. As the $T_B$ value is not determined, if the $T_B$ value is small, the beacon channel is frequently generated and the chance for the slaves in the park mode to be activated accordingly increases. However, the chance for currently activated slaves to transmit the data decreases as the chance for the parked slaves to be activated increases. Additionally, when the $T_B$ value is too great, the activated slaves can perform a normal transmission, but the parked slaves have to wait a long time to be connected with the master.

SUMMARY OF THE INVENTION

The present invention has been made to overcome the above-mentioned problems of the prior art. Thus, it is an object of the present invention to provide a wireless communication apparatus and a method for determining a time interval of a train of beacon slots by considering the amount of traffic used by activated slaves and the number of parked slaves.

The above object is accomplished by providing a wireless communication apparatus according to the present invention, including a beacon channel generator for generating a train of beacon slots during a park mode, with a first cycle, a slot section calculator for calculating a second cycle of the train of beacon slots based on a coefficient of slot utilization and a wakeup ratio in a slot section, and a controller for controlling the beacon channel generator to generate the train of beacon slots according to the second cycle calculated by the slot section calculator. The beacon channel generator sets up an access window for giving the parked slaves, which want a connection to the master, an opportunity to transmit data to the master.

The above object is also accomplished by a wireless communication method according to the present invention, including the steps of: generating a train of beacon slots during a park mode, with a first cycle; calculating a second cycle of the train of beacon slots based on a coefficient of slot utilization and a wakeup ratio; and controlling a beacon channel generator to generate the train of beacon slots according to the second cycle calculated in the calculating step.

The calculation step includes the steps of: comparing a difference between the coefficient of slot utilization of a current slot section and the coefficient of slot utilization of a previous slot section; and comparing a difference between the wakeup ratio of the current slot section and the wakeup ratio of the previous slot section, when a value obtained by subtracting the coefficient of slot utilization of the previous slot section from the coefficient of slot utilization of the current slot section is greater than a first predetermined value. The second cycle is calculated to be longer than the first period, when a value obtained by subtracting the wakeup ratio of the current slot section from the wakeup ratio of the previous slot section is greater than a second predetermined value.

The calculating step calculates the second cycle to be equal to the first cycle when the value obtained by subtracting the wakeup ratio of the current slot section from the wakeup ratio of the previous slot section is less than the second predetermined value.

In the case that the value obtained by subtracting the coefficient of slot utilization of the previous slot section from the coefficient of slot utilization of the current slot section is less than the first predetermined value, the calculating step calculates the second cycle to be shorter than the first cycle when a value obtained by subtracting the wakeup ratio of the previous slot section from the wakeup ratio of the current slot section is less than the second predetermined value.

The calculating step calculates the second cycle to be equal to the first cycle when the value obtained by subtracting the wakeup ratio of the previous slot section from the wakeup ratio of the current slot section is less than the second predetermined value.

According to the present invention, the wireless communication apparatus can adjust the time interval of the trains of beacon slots according to the amount of the traffic in the piconet. Therefore, the wireless communication apparatus can improve the efficiency of the piconet in accordance with the amount of the traffic although the number of the parked slaves is changed in the piconet.

BRIEF DESCRIPTION OF THE DRAWINGS

The above-mentioned object and features of the present invention will be more apparent by describing the preferred embodiment of the present invention by referring to the appended drawings, in which.

DETAILED DESCRIPTION OF THE PREFERRED EMBODIMENT

Hereinbelow, the present invention will be described in greater detail by referring to the appended drawings.

Figure 1:
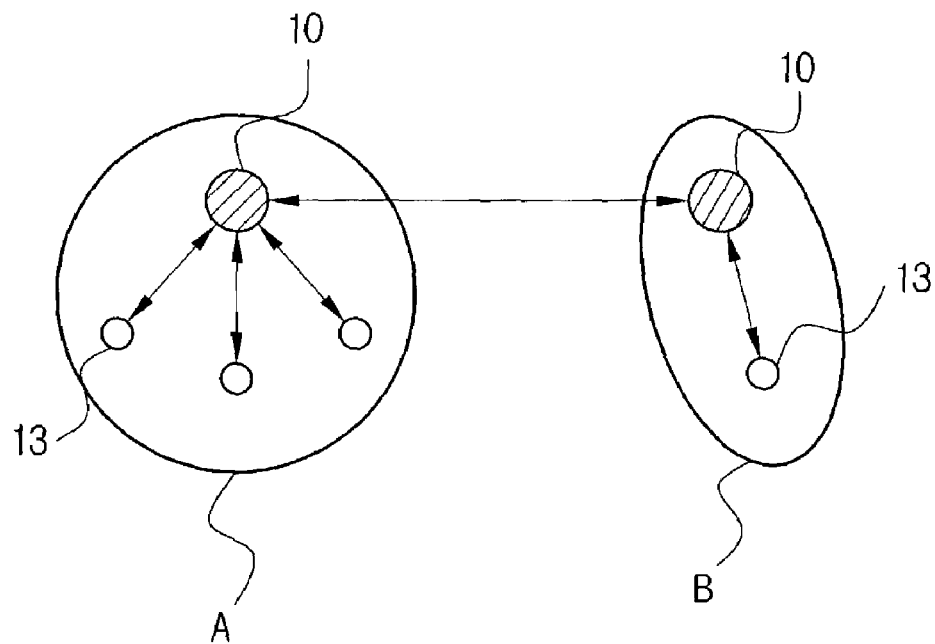
FIG. 1 is a view showing a scatternet of a Bluetooth system.
Figure 2:
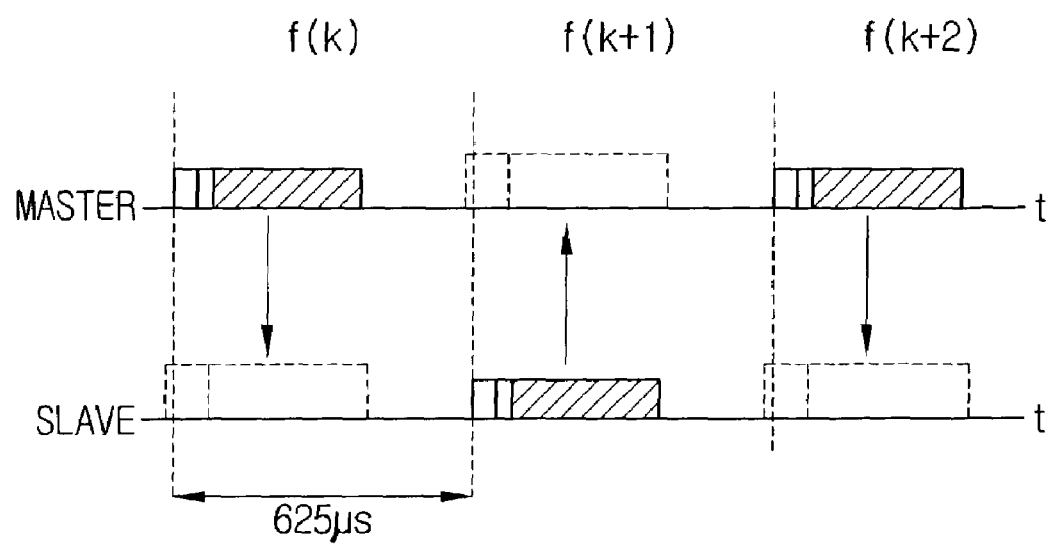
FIG. 2 is a view showing communication by TDD between a master and slaves.
Figure 3:
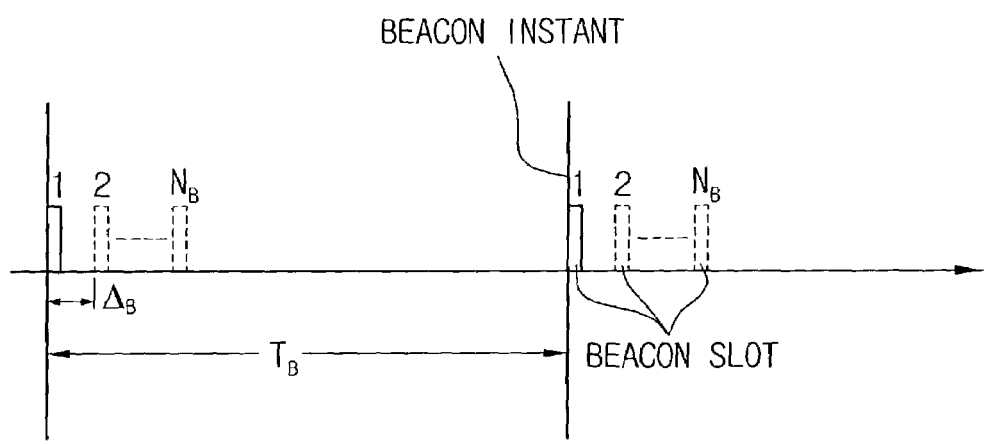
FIG. 3 is a view showing a general beacon channel format.
Figure 4:
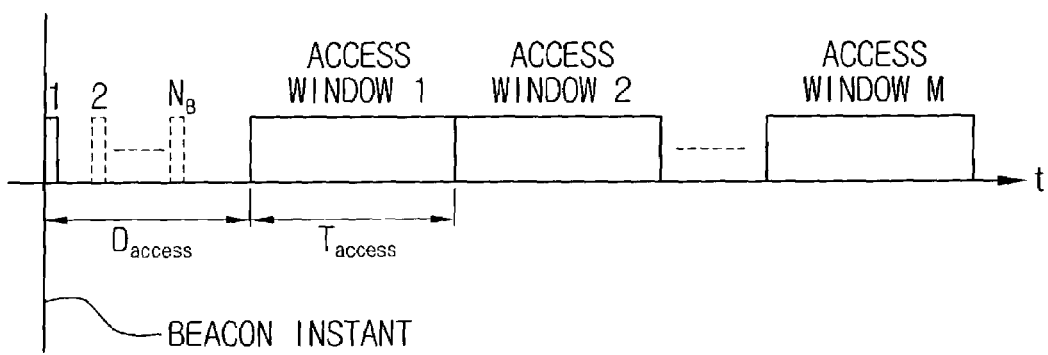
FIG. 4 is a view explaining an access window.
Figure 5:
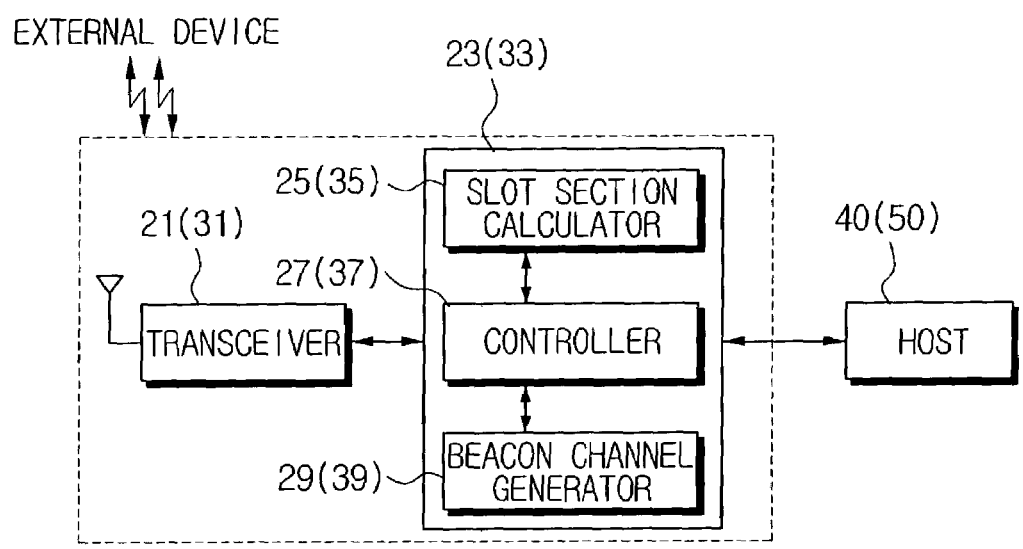
FIG. 5 is a block diagram schematically showing a wireless communication apparatus according to the present invention.

FIG. 5 is a block diagram schematically showing a wireless communication apparatus according to the present invention. Referring to FIG. 5, the wireless communication apparatus comprises a transceiver 21(31), a beacon generator 23(33), and a host 40(50). The beacon generator 23(33) has a slot section calculator 25(35), a controller 27(37), and a beacon channel generator 29(39). Here, among the reference numerals given to the same elements, 21, 23, 25, 27, 29 and 40 are given to the elements of the wireless communication apparatus operating as slaves, and the reference numerals 31, 33, 35, 37, 39 and 50 are given to the elements of the wireless communication apparatus operating as a master.

The transceiver 21(31) processes a signal transmitted from outside, for example, a RF (Radio Frequency) signal, and sends a data packet for transmission to the outside. The beacon channel generator 29(39) generates a train of beacon slots in a park mode with a predetermined interval. Here, a train of beacon slots, which is generated by the beacon channel generator 29(39), means a predetermined number of beacon slots arrayed at a predetermined time interval. The beacon channel generator 29(39) sets up an access window for activating the transmission with an external apparatus after a predetermined number of trains of beacon slots are generated. Here, the access window means an area capable of transmitting a signal (access request signal) for converting the parked slaves into a normal status (unparked mode). To increase the reliability, the access window can be repeated $M_{access}$ times ($M_{access}>1$).

The slot section calculator 25(35) calculates a time interval between the trains of beacon slots consecutively generated, based on a coefficient of slot utilization and a wakeup ratio of the trains of beacon slots generated by the beacon channel generator 29(39). Here, the coefficient of slot utilization means a slot ratio used per unit of time, and the wakeup ratio means ratio of the unparked slaves.

The controller 27(37) controls the beacon channel generator 29(39) to allow the trains of beacon slots to be generated with the time interval calculated by the slot section calculator 25(35).

The host 40(50) performs an original aim of the wireless communication apparatus. For example, in the case the wireless communication apparatus is a printer, the host 40(50) performs a function of the printer, in other words, printing.

Here, the master determines an overall characteristic in regard to the channel in the piconet. A Bluetooth device address (BD_ADDR) of the master determines a frequency hopping sequence and a channel access code. In other words, the clock of the master determines the phase of the hopping sequence and sets up timing. Moreover, the master controls traffic of the channel. Any digital apparatuses can be the master. When the piconet is once formed, the role of the master and the slaves can be changed.

Figure 6:
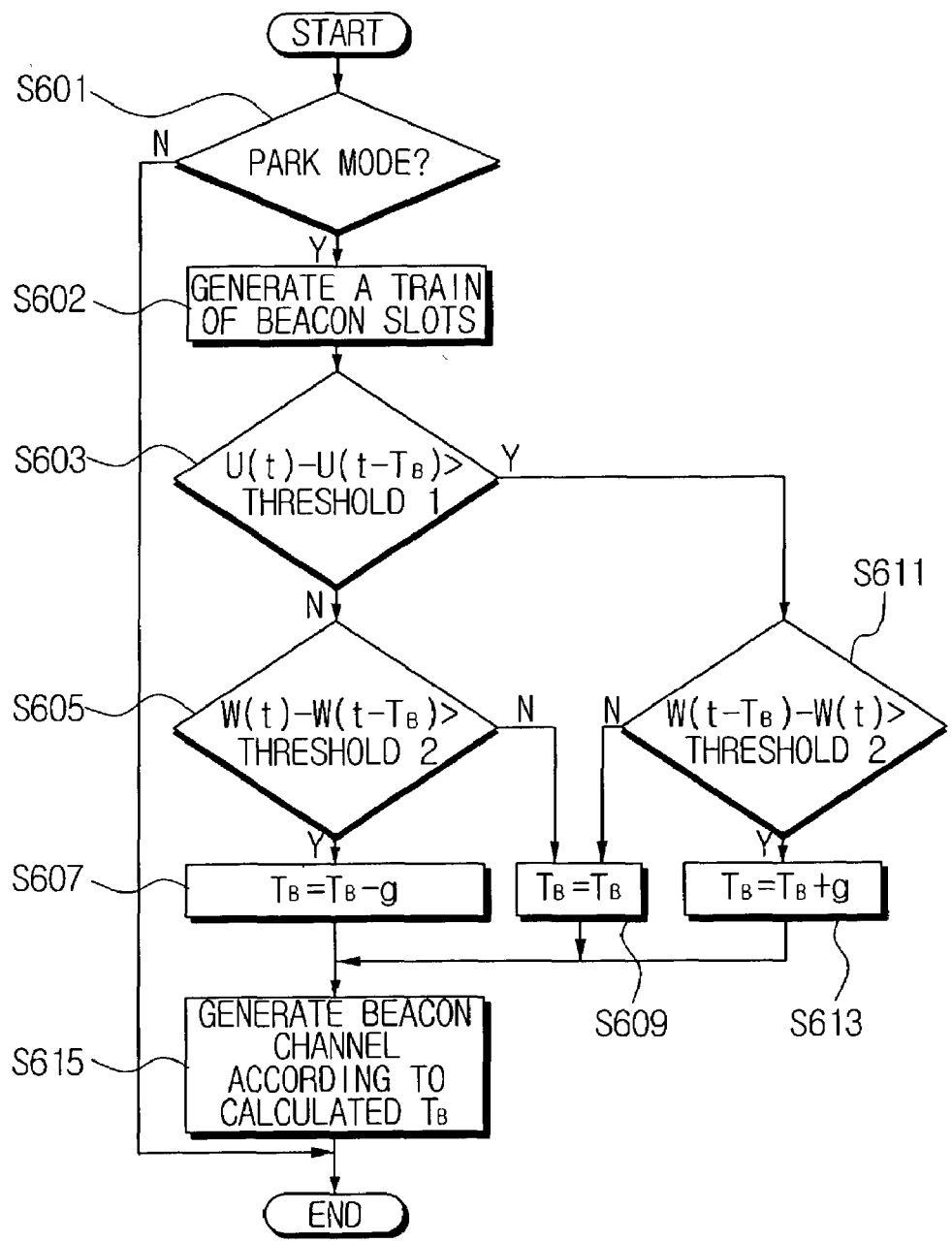
FIG. 6 is a flow chart showing a wireless communication method by the apparatus of FIG. 5.

FIG. 6 is a flow chart showing a wireless communication method performed by the apparatus of FIG. 5. Referring to FIG. 6, the operation of the wireless communication apparatus according to the present invention will be described in greater detail.

The controller 27(37) judges whether the wireless communication apparatus is in the park mode (S601). When it is judged that the wireless communication apparatus is in the park mode, the controller 27(37) controls the beacon channel generator 29(39) to generate the trains of beacon slots at the predetermined interval. The beacon channel generator 29(39) generates the trains of beacon slots in the park mode with the predetermined interval (S602).

The slot section calculator 25(35) calculates the time intervals between the trains of beacon slots consecutively generated based on the coefficient of slot utilization and the wakeup ratio. To calculate the time intervals of the trains of beacon slots, the slot section calculator 25(35) compares the difference of the coefficient of slot utilization of the current slot section and the coefficient of slot utilization of the previous slot section (S603).

When the coefficient of slot utilization of the current slot section is not greater than the coefficient of slot utilization of the previous slot section as much as a first predetermined value, the slot section calculator 25(35) compares the wakeup ratio of the current slot section and the wakeup ratio of the previous slot section (S605). When the wakeup ratio of the current slot section is greater than the wakeup ratio of the previous slot section by more than a second predetermined value, the slot section calculator 25(35) calculates the time interval of the train of beacon slots to be shorter than the time interval of the previous train of beacon slots by a predetermined time (S607). Here, the first predetermined value is a difference value between a threshold of the coefficient of slot utilization of the current slot section and the previous slot section. The second predetermined value is a difference value between a threshold of the wakeup ratio of the current slot section and the previous slot section. Referring to FIG. 6, the coefficient of slot utilization of the current slot section is shown as U(t), the wakeup ratio of the current slot section is shown as W(t), the coefficient of slot utilization of the previous slot section is shown as $U(t-T_B)$, and the wakeup ratio of the previous slot section is shown as $W(t-T_B)$.

When the wakeup ratio of the current clot section is not greater than the wakeup ratio of the previous slot section for the second predetermined value, after the wakeup ratio of the current slot section and the wakeup ratio of the previous slot section are compared (S605), the slot section calculator 25(35) calculates the time interval of the train of beacon slots to be the same as the time interval of the previous slot section (S609).

When the coefficient of slot utilization of the current slot section is greater than the coefficient of slot utilization of the previous slot section by the first predetermined value, after the difference of the coefficient between slot utilization of the current slot section and the coefficient of slot utilization of the previous slot section are compared (S603), the slot section calculator 25(35) compares the wakeup ratio of the current slot section and the previous slot section (S611). When the wakeup ratio of the previous slot section is greater than the wakeup ratio of the current slot section by the second predetermined value, the slot section calculator 25(35) calculates the time interval of the train of beacon slots to be longer than the time interval of the previous train of beacon slots (S613).

When the wakeup ratio of the previous slot section is not greater than the wakeup ratio of the current slot section for the second predetermined value, after the wakeup ratio of the current slot section and the previous slot section are compared (S611), the slot section calculator 25(35) calculates the time interval of the train of beacon slots to be the same as the time interval of the previous slot section (S609).

The controller 27(37) controls the beacon channel generator 29(39) to allow the trains of beacon slots to be generated with the time interval of the slot section calculated by the slot section calculator 25(35). The beacon channel generator 29(39) generates the trains of beacon slots at the time interval calculated by the controller 27(37) (S615). The beacon channel generator 29(39) sets up the access window for giving the parked slaves an opportunity to be connected with the master, after the trains of beacon slots are generated by the controller 27(37). The controller 27(37) can send the unpark request signal through the access window set up by the beacon channel generator 29(39).

Accordingly, the wireless communication apparatus can adjust the time interval of the trains of beacon slots according to the coefficient of slot utilization and the wakeup ratio of the slot section, thus the wireless communication apparatus can appropriately cope with the change of the traffic characteristic of the piconet.

According to the present invention, the wireless communication apparatus can adjust the time interval of the trains of beacon slots according to the amount of the traffic in the piconet. Therefore, the wireless communication apparatus can improve the efficiency of the piconet in accordance with the amount of traffic although the number of the parked slaves is changed in the piconet.

So far, the preferred embodiment of the present invention has been illustrated and described. However, the present invention is not limited to the preferred embodiment described here, and someone skilled in the art can modify the present invention within the scope of the invention defined by the claims.

What is claimed is:

1. A wireless communication apparatus, comprising:
   a beacon channel generator for generating a train of beacon slots during a park mode, with a first cycle;
   a slot section calculator for calculating a second cycle of the train of beacon slots based on a coefficient of slot utilization and a wakeup ratio in a slot section; and
   a controller for controlling the beacon channel generator to generate the train of beacon slots according to the second cycle calculated by the slot section calculator.

2. The apparatus of claim 1, wherein the slot section calculator calculates the second cycle to be longer than the first cycle, when, a value obtained by subtracting the coefficient of slot utilization of a previous slot section from the coefficient of slot utilization of a current slot section is greater than a first predetermined value, and a value obtained by subtracting the wakeup ratio of the current slot section from the wakeup ratio of the previous slot section is greater than a second predetermined value.

3. The apparatus of claim 1, wherein the slot section calculator calculates the second cycle to be equal to the first cycle, when, a value obtained by subtracting the coefficient of slot utilization of a previous slot section from the coefficient of slot utilization of a current slot section is greater than a first predetermined value, and a value obtained by subtracting the wakeup ratio of the current slot section from the wakeup ratio of the previous slot section is less than a second predetermined value.

4. The apparatus of claim 1, wherein the slot section calculator calculates the second cycle to be shorter than the first cycle, when, a value obtained by subtracting the coefficient of slot utilization of a previous slot section from the coefficient of slot utilization of a current slot section is less than a first predetermined value, and a value obtained by subtracting the wakeup ratio of the previous slot section from the wakeup ratio of the current slot section is greater than a second predetermined value.

5. The apparatus of claim 1, wherein the slot section calculator calculates the second cycle to be equal to the first cycle, when, a value obtained by subtracting the coefficient of slot utilization of a previous slot section from the coefficient of slot utilization of a current slot section is less than a first predetermined value, and a value obtained by subtracting the wakeup ratio of the previous slot section from the wakeup ratio of the current slot section is less than a second predetermined value.

6. A wireless communication method comprising the steps of:
   generating a train of beacon slots during a park mode, with a first cycle;
   calculating a second cycle of the train of beacon slots based on a coefficient of slot utilization and a wakeup ratio; and
   controlling a beacon channel generator to generate the train of beacon slots according to the second cycle calculated in the calculating stop.

7. The method of claim 6, wherein the calculation step includes the steps of:
   comparing a difference between the coefficient of slot utilization of a current slot section and the coefficient of slot utilization of a previous slot section; and
   comparing a difference between the wakeup ratio of the current slot section and the wakeup ratio of the previous slot section, when a value obtained by subtracting the coefficient of slot utilization of the previous slot section front the coefficient of slot utilization of the current slot section is greater than a first predetermined value,
   wherein the second cycle is calculated to be longer than the flat cycle, when a value obtained by subtracting the wakeup ratio of the current slot section from the wakeup ratio of the previous slot section is greater than a second predetermined value.

8. The method of claim 7, wherein the calculating step calculates the second cycle to be equal to the first cycle when the value obtained by subtracting the wakeup ratio of the current slot section from the wakeup ratio of the previous slot section is less than the second predetermined value.

9. The method of claim 7, wherein, in the case that the value obtained by subtracting the coefficient of slot utilization of the previous slot section from the coefficient of slot utilization of the current slot section is less than the first predetermined value,
   the calculating step calculates the second cycle to be shorter than the first cycle when a value obtained by subtracting the wakeup ratio of the previous slot section from the wakeup ratio of the current slot action is less than the second predetermined value.

10. The method of claim 9, wherein the calculating step calculates the second cycle to be equal to the first cycle when the value obtained by subtracting the wakeup ratio of the previous slot section from the wakeup ratio of the current slot section is less than the second predetermined value.

11. The method according to claim 1, wherein said coefficient of slot utilization comprises a slot ratio used per unit of time.

12. The method according to claim 1, wherein said wakeup ratio comprises a ratio of unparked slaves.

* * * * *